H. STRAUB.
VEHICLE THIEF DETECTOR.
APPLICATION FILED AUG. 19, 1921.
1,437,619.
Patented Dec. 5, 1922.
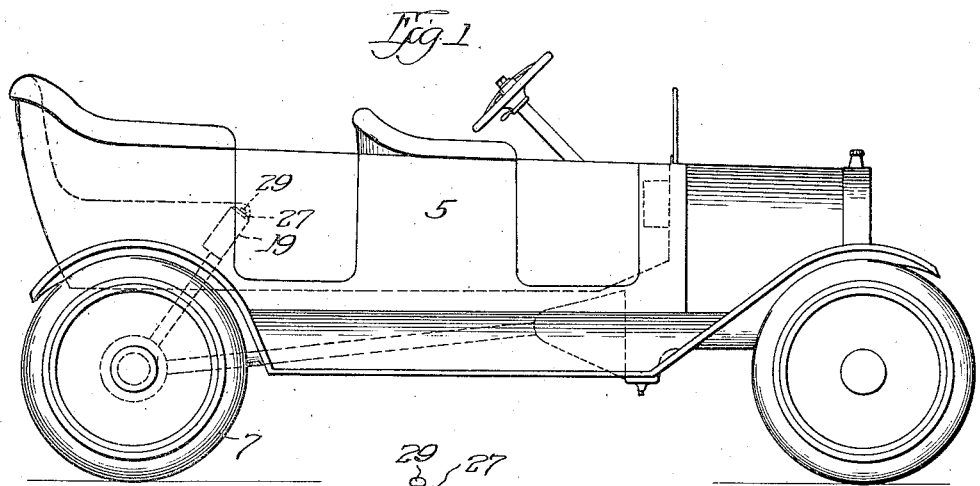
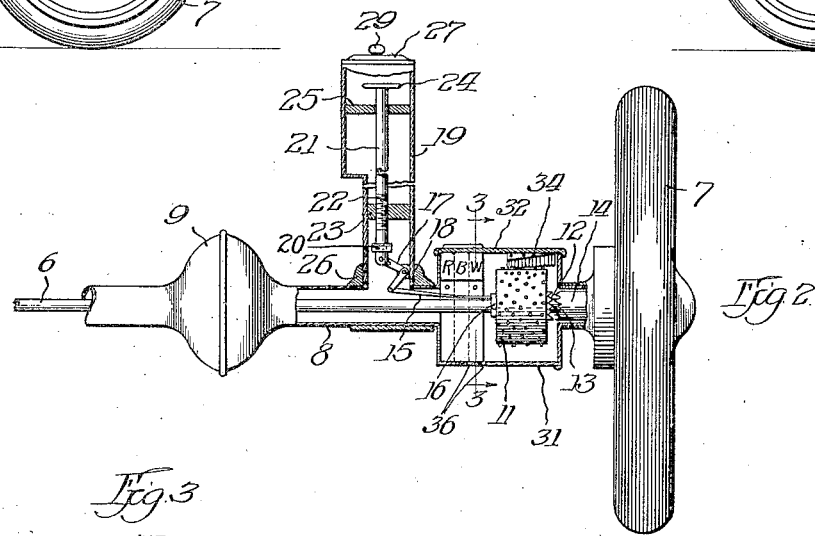
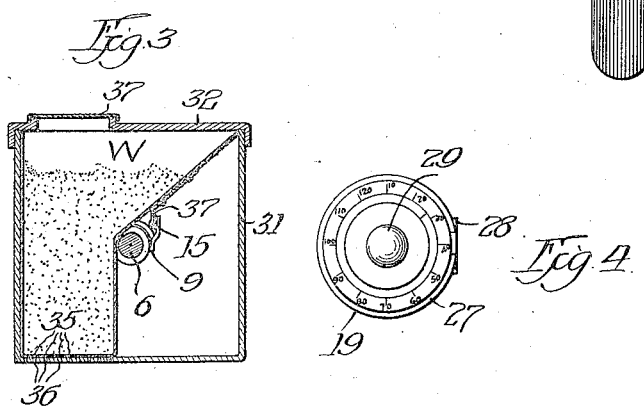
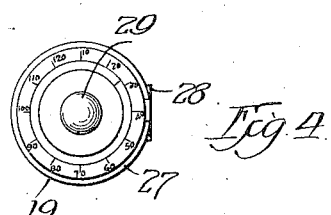
Witness:
Inventor
Hans Straub Patented Dec. 5, 1922.

1,437,619

UNITED STATES PATENT OFFICE.

HANS STRAUB, OF CHICAGO, ILLINOIS.

VEHICLE THIEF DETECTOR.

Application filed August 19, 1921. Serial No. 493,605.

*To all whom it may concern:*

Be it known that I, HANS STRAUB, a citizen of Germany, residing at Chicago, in the county of Cook and State of Illinois, have invented new and useful Improvements in Vehicle Thief Detectors, of which the following is a specification.

This invention relates in general to vehicle equipment, and while primarily designed as an attachment for automobiles, it may manifestly be employed in connection with other vehicles.

I am aware that automobiles are equipped with various types of lock devices such as ignition locks, steering gear locks, transmission gear locks, and wheel locks designed to prevent the theft or unauthorized use of the car. Many of them, however, can be very quickly rendered inoperative and ineffective by a skilled mechanic, a lock picker or a professional thief, consequently, many cars equipped with such devices are frequently stolen with slight probability of their recovery and without leaving a clue toward the apprehension of the thief.

My present invention, instead of aiming toward rendering the car inoperative, as many automobile locks are intended to do, and which as a matter of fact merely temporarily delay the thief in the accomplishment of his nefarious purpose, has for its primary object the apprehension of the thief and aims to render his capture and the recovery of the car practically certain. The speedy capture of and administration of justice to a plentiful number of automobile thieves will, it is believed, quickly reduce and render more unpopular, as well as unprofitable, this type of thievery.

With this general purpose in view, my invention contemplates the equipment of an automobile with a novel device, which, while not intended to frustrate or even hamper the unauthorized driving of the car away, will conspicuously announce to others in the vicinity the fact that the car has been stolen, and should the thief in spite of the attention attracted, succeed in making good his escape with the car, his seemingly successful accomplishment will be barren, and in fact, will result in his detection for the reason that while he is hurriedly speeding away, my invention is with unerring certainty leaving a conspicuous and temporarily ineradicable trail, along which his pursuers may unerringly follow him to his haunt.

My invention, in one of its preferred embodiments and many of its inherent capabilities and advantages will be readily understood and appreciated from a perusal of the following description when considered in connection with the accompanying drawing.

Referring to the drawing:

Fig. 1 is a side view of an automobile equipped with my invention;

Fig. 2 is a fragmentary view, partially in section, of the rear axle structure showing my invention applied thereto;

Fig. 3 is a transverse sectional view on the line 3—3 of Fig. 2; and

Fig. 4 is a plan view of the removable cap for the casing.

Referring now to the drawings more in detail, reference character 5 indicates generally an automobile of any preferred construction, the popular type shown being merely illustrative, as obviously, my invention is adaptable with equal facility to any make of pleasure car, truck, or other vehicle. The rear axle of the car, indicated by reference character 6, is connected with the rear wheels 7 in the usual manner and is enclosed in the cylindrical housing 8, which is customarily formed to provide the differential case 9. Upon this axle and in proximity to one of the wheels, there is splined by means of a key or otherwise, so that it may slide longitudinally of the axle a limited distance, but will be restricted to rotate therewith, a cylinder 11 equipped at its outer end with clutch teeth 12 adapted when the cylinder is moved toward the end of the axle to engage with companion clutch teeth 13 formed in a collar or sleeve 14 attached to the axle of the wheel so as to rotate therewith. The cylinder is moved longitudinally on the axle from the inoperative position shown in Fig. 2 into driven relation with the sleeve 14 by means of a link 15 rotatably connected with the cylinder through a sleeve 16 and attached at its other end to one arm of a bell crank lever 17 fulcrumed at 18 in a suitable support upon the interior of a casing 19. The other arm of the bell crank lever is connected thru a swivel 20 with a rod 21 threaded throughout a portion of its length, as indicated at 22 for threaded engagement with a nut 23 fixedly mounted in the casing 19. The upper end of this rod is equipped with a handle or hand wheel 24 disposed near the upper end of the casing and a guide or bearing 25 fixed in the casing serves to maintain the rod against displacement.

The casing 19 may be constructed integrally with the axle housing 8, but preferably it is attached thereto and for this purpose, the housing is equipped with a tapped boss 26 into which the lower end of the casing is threaded. This casing may extend in any preferred direction from the axle and may be disposed rearwardly of the car body, but for purposes of convenience and accessibility, I have illustrated it herein as projecting upwardly through the floor of the car and terminating in accessible position just forwardly of the rear seat as shown in Fig. 1, where it will occupy but a small amount of space and will cause but slight inconvenience to the passengers. The upper end of the casing is equipped with a cap 27, preferably hinged thereto at one side, as indicated at 28 (Fig. 4) and this cap is provided with a combination lock adapted to be actuated by the usual knob 29, by the proper manipulation of which the cap may be locked in closed position or released so that it may be swung back to permit access to the hand wheel 24 within the casing.

The axle housing 8 is shaped to provide or is equipped with an enlarged casing 31 adapted to house the cylinder 11 and other parts, as will be later explained. This casing has preferably a removable top 32 through which access to the interior of the casing may be had. The perimeter of the cylinder itself is equipped with a series of projections 33 of metal, wood, or other construction, which may be stamped out from the body of the metal cylinder or may consist of wood or metal pins set into the perimeter of the cylinder. In proximity to the cylinder and in the path of these pins or projections is mounted a series of signals 34, which in the present instance are audible signals, such as resonant, vibratory plates or bars, which when engaged by the projections on the rotating cylinder, will resound in loud audible tones so as to attract the attention of police officers or other people in the vicinity. These signals may be of any preferred type, such as bells, gongs, or other audible signals, and if desirable, a visible signal or signals might be substituted in lieu of an audible signal so that a light might be flashed or a target raised to a conspicuous position bearing legible information that the car was stolen, or any other means of attracting attention, capable of being actuated by the revolving cylinder 11, might be employed.

With such a signal in operation, the progress of the stolen vehicle would be sufficiently conspicuous to, in most instances, result in the immediate apprehension of the thief by the authorities, but in the event that such were not the case, my invention makes provision for his ultimate capture and recovery of the car by leaving a trail which can be readily followed by the pursuers. With this end in view, I have mounted within the casing 31 a plurality of (in the present instance three) receptacles or containers indicated by reference characters R, B and W respectively. These containers are preferably made of metal and for convenience in manufacture, consist of one container provided with two partitions dividing it into compartments of substantially equal capacity. The bottom of each receptacle is provided with one or more perforations 35, and similarly the bottom of the casing 31 is provided with a like number of perforations 36 adapted to register with the perforations 35 when the receptacles are moved into a predetermined position. The receptacles are connected by a bracket plate 37 to the link or bar 15 so that they may slide within the casing upon actuation of the link, from inoperative position shown in Fig. 2 where the perforations 35 are disposed between the perforations 36, into a position where the perforations 35 and 36 are aligned, providing a discharge exit from the receptacles, so that their contents may be distributed over the roadway as the car travels along. The receptacles may be charged with any suitable material, and for convenience, a removable cap 37 is provided on the top of the casing 31 through which the receptacles may be filled when required. Any suitable material in liquid, semi-liquid, or powdered state may be employed in the receptacles, and preferably, wet powdered material is used, receptacle R being charged with red powder, B with black, and W with white, altho obviously, any other preferred colors may be employed. I prefer, however, the colors mentioned since the black will be conspicuous on snow, or white pavements, the white upon asphalt or dark colored pavements, and the red is quite conspicuous upon any background. The jiggling of the car in transit will cause the material to be deposited at intervals upon the roadway, and as previously stated, if powdered materials are employed, they are preferably moistened so that they will not be blown away by a high wind so as to diminish the conspicuousness of the trail. Obviously, the powders may be previously moistened, or suitable moistening mechanism may be added to the apparatus by which the powder is sufficiently moistened just prior to its delivery.

In the operation of my protector, a driver, when leaving his car opens the cap 27, turns the handle 24 so as to thread the rod 21 downwardly in the nut 23, thus, through the bell crank lever 17 and the link 15, sliding the receptacles R, B and W to the right, viewing Fig. 2 along the axle and likewise the cylinder 11. The receptacles when thus positioned are in alignment with the discharge apertures 36 and the cylinder is clutched to the sleeve 14 through the interengaging clutch teeth 12 and 13. The lid 27 is now closed and through manipulation of the lock knob 29 the lid is locked in closed position so that it cannot be opened by one not familar with the combination. Should a thief during the absence of the driver select this car as his booty, no obstacle in the shape of locks, effective or ineffective are interposed in his way. He may start the motor and proceed down the thoroughfare, but no sooner has the car gotten under way than the rotating cylinder 11 will actuate the signal, and if an audible signal such as vibrating bars or ringing bells are employed, attention will be immediately directed to the car, and with either an audible or a visible signal, the knowledge will be immediately conveyed that the car has been stolen. Should the theft occur in a sparsely populated district or should the thief drive so rapidly that he can not be immediately stopped, his course may be readily followed since, as he proceeds, a conspicuous trail of colored matter will be left behind him upon the roadway. Should, therefore, his escape be temporarily successful, his course may be easily followed and his ultimate apprehension and the recovery of the car will inevitably occur.

It is believed that my invention, its mode of operation, and many of its inherent advantages will be readily understood from the foregoing without further description, and it should be manifest that I have provided a device which is simple in construction, easy to install, and economical to operate. While I have shown and described a preferred embodiment, manifestly, the details of construction illustrated and described are capable of wide modification and variation without departing from the essence of the invention as defined in the following claims.

I claim:

1. In a device of the character described, the combination with a vehicle including an axle and a wheel mounted thereon, of a cylinder loosely mounted on said axle, a clutch interposed between the cylinder and said wheel whereby said cylinder may be rotated from said wheel, a signal producing apparatus operable by said cylinder upon rotation thereof, mechanism for moving said cylinder into operative position so as to produce a signal upon movement of the vehicle, and means including a lock for preventing unauthorized access to said mechanism.

2. In a device of the character described, the combination with a vehicle including an axle and a wheel thereon, of a cylinder slidably mounted on said axle, signalling apparatus adapted to be operated by said cylinder, a clutch adapted to effect a driving connection between said wheel and said cylinder, mechanism for rendering said cylinder operative upon movement of the vehicle, a casing enclosing said mechanism, and means whereby said casing may be locked to prevent access to said mechanism.

3. In a device of the character described, the combination with a vehicle including an axle and a wheel mounted thereon, of a cylinder loosely mounted on said axle, a clutch interposed between the cylinder and said wheel whereby the cylinder may be rotated from the wheel, a signal producing apparatus operable by said cylinder upon rotation thereof, means for moving said cylinder longitudinally of the axle to dispose said clutch in operative and inoperative position at will, said means comprising a bell crank lever, a link connecting said lever and said cylinder, a manually operable device for actuating said lever, a casing enclosing said manually operable device, and a locked cover for sealing said casing.

4. In a device of the character described, the combination of a vehicle including an axle and a wheel mounted thereon, a cylinder loosely mounted on said axle, a clutch interposed between said wheel and said cylinder, a signal producing apparatus operable by the cylinder upon rotation thereof, means operable from within the body of the vehicle for engaging and disengaging said clutch, a casing enclosing said means and projecting from the axle to a point within the body of the vehicle, and a closure for said casing disposed within the body of the vehicle and adapted to be locked to preclude access to said means.

HANS STRAUB.